United States Patent
Becker et al.

(10) Patent No.: US 7,156,172 B2
(45) Date of Patent: Jan. 2, 2007

(54) METHOD FOR ACCELERATING OIL WELL CONSTRUCTION AND PRODUCTION PROCESSES AND HEATING DEVICE THEREFOR

(75) Inventors: Thomas E. Becker, Duncan, OK (US); Frank Zamora, Duncan, OK (US); Verland Granberry, Alvin, TX (US); Robert B. Carpenter, Sugar Land, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 106 days.

(21) Appl. No.: 10/791,211

(22) Filed: Mar. 2, 2004

(65) Prior Publication Data

US 2005/0194190 A1    Sep. 8, 2005

(51) Int. Cl.
*E21B 33/14* (2006.01)
*E21B 33/13* (2006.01)
*C09K 8/42* (2006.01)

(52) U.S. Cl. .................. 166/288; 166/295; 166/302

(58) Field of Classification Search ............... 166/288, 166/302, 294, 295
See application file for complete search history.

(56) References Cited

U.S. PATENT DOCUMENTS

| | | | | |
|---|---|---|---|---|
| 2,363,269 A | | 11/1944 | Schlumberger | 166/288 |
| 2,441,860 A | * | 5/1948 | Whetstone | 525/480 |
| 3,004,600 A | * | 10/1961 | Henderson et al. | 166/257 |
| 3,087,543 A | | 4/1963 | Arendt | |
| 3,171,480 A | | 3/1965 | Carter | |
| 3,208,530 A | | 9/1965 | Allen et al. | 166/60 |
| 3,334,689 A | | 8/1967 | McLaughlin | 166/33 |
| 3,366,177 A | * | 1/1968 | Powers et al. | 166/276 |
| 3,417,816 A | * | 12/1968 | Morris et al. | 166/290 |
| 3,490,533 A | | 1/1970 | McLaughlin | 166/270 |
| 3,502,148 A | * | 3/1970 | Slagle et al. | 166/292 |
| 3,620,302 A | * | 11/1971 | Parsons | 166/258 |
| 3,871,455 A | * | 3/1975 | Hardy et al. | 166/288 |
| 3,881,552 A | | 5/1975 | Hessert | |
| 3,895,953 A | * | 7/1975 | Mehta | 524/8 |
| 4,024,916 A | | 5/1977 | Hartley et al. | 166/288 |
| 4,107,057 A | | 8/1978 | Dill et al. | 252/8.55 C |
| 4,125,504 A | * | 11/1978 | Mani et al. | 524/5 |

(Continued)

FOREIGN PATENT DOCUMENTS

EP    1 028 096 A2    8/2000

(Continued)

OTHER PUBLICATIONS

Foreign communication from a related counterpart application dated May 27, 2005.

(Continued)

*Primary Examiner*—David Bagnell
*Assistant Examiner*—Shane Bomar
(74) *Attorney, Agent, or Firm*—Craig W. Roddy; Haynes and Boone, L.L.P.

(57) ABSTRACT

Methods are described for providing localized heating in an oil well at precise depths to accomplish or expedite specific objectives. The methods involve the use of a heating tool which can be lowered into an oil well to apply heat at a precise depth to achieve a desired result. The specific objectives may include localized heating of a fresh cement slurry to accelerate curing, or localized heating of recently emplaced chemicals which are formulated to be thermally activated. One purpose of such chemicals is to viscosify or increase in gel strength after being pumped into an oil well production zone, in order to restrict the production of unwanted formation fluids such as water.

8 Claims, 2 Drawing Sheets

U.S. PATENT DOCUMENTS

| | | | | |
|---|---|---|---|---|
| 4,151,150 A | * | 4/1979 | Peters et al. | 524/8 |
| 4,279,299 A | | 7/1981 | Shuck | 166/60 |
| 4,395,340 A | | 7/1983 | McLaughlin | 252/8.55 D |
| 4,401,789 A | | 8/1983 | Gideon | 524/827 |
| 4,417,625 A | | 11/1983 | Henson et al. | 166/387 |
| 4,439,334 A | | 3/1984 | Borchardt | 252/8.55 D |
| 4,489,784 A | | 12/1984 | Messenger | 166/288 |
| 4,489,785 A | | 12/1984 | Cole | |
| 4,500,357 A | | 2/1985 | Brothers et al. | 106/90 |
| 4,512,721 A | | 4/1985 | Ayres et al. | 417/51 |
| 4,519,452 A | | 5/1985 | Tsao et al. | 166/288 |
| 4,522,653 A | | 6/1985 | Rao et al. | 106/90 |
| 4,538,682 A | | 9/1985 | McManus et al. | 166/255 |
| 4,554,081 A | | 11/1985 | Borchardt et al. | 252/8.5 A |
| 4,600,057 A | | 7/1986 | Borchardt | 166/295 |
| 4,612,959 A | | 9/1986 | Costello | 137/828 |
| 4,809,780 A | | 3/1989 | Shen | |
| 4,846,888 A | * | 7/1989 | Detroit | 106/694 |
| 4,900,196 A | | 2/1990 | Bridges | 405/267 |
| 4,919,201 A | | 4/1990 | Bridges et al. | 166/60 |
| 5,012,868 A | | 5/1991 | Bridges | 166/248 |
| 5,062,969 A | | 11/1991 | Holtmyer et al. | 252/8.551 |
| 5,065,818 A | | 11/1991 | Van Egmond | 166/60 |
| 5,070,533 A | | 12/1991 | Bridges et al. | 392/301 |
| 5,099,918 A | | 3/1992 | Bridges et al. | 166/60 |
| 5,121,795 A | | 6/1992 | Ewert et al. | 166/292 |
| 5,123,487 A | | 6/1992 | Harris et al. | 166/277 |
| 5,125,455 A | | 6/1992 | Harris et al. | 166/292 |
| 5,127,473 A | | 7/1992 | Harris et al. | 166/277 |
| 5,135,577 A | | 8/1992 | Brothers | 106/724 |
| 5,159,980 A | | 11/1992 | Onan et al. | 166/294 |
| 5,159,983 A | | 11/1992 | Barron et al. | 166/379 |
| 5,238,064 A | | 8/1993 | Dahl et al. | 166/293 |
| 5,293,938 A | | 3/1994 | Onan et al. | 166/293 |
| 5,335,726 A | | 8/1994 | Rodrigues | 166/295 |
| 5,339,903 A | | 8/1994 | Eoff et al. | 166/293 |
| 5,341,881 A | | 8/1994 | Rodrigues | 166/293 |
| 5,358,051 A | | 10/1994 | Rodrigues | 166/295 |
| 5,421,879 A | | 6/1995 | Rodrigues | 106/727 |
| 5,458,195 A | | 10/1995 | Totten et al. | 166/293 |
| 5,536,311 A | | 7/1996 | Rodrigues | 106/724 |
| 5,569,324 A | | 10/1996 | Totten et al. | 106/696 |
| 5,588,488 A | | 12/1996 | Vijn et al. | 166/293 |
| 5,621,844 A | | 4/1997 | Bridges | 392/301 |
| 5,688,844 A | | 11/1997 | Chatterji et al. | 524/8 |
| 5,713,415 A | | 2/1998 | Bridges | 166/60 |
| 5,795,924 A | | 8/1998 | Chatterji et al. | 523/130 |
| 5,833,001 A | | 11/1998 | Song et al. | |
| 5,840,784 A | | 11/1998 | Funkhouser et al. | 523/130 |
| 5,873,413 A | | 2/1999 | Chatterji et al. | 166/293 |
| 5,875,844 A | | 3/1999 | Chatterji et al. | 166/293 |
| 5,875,845 A | | 3/1999 | Chatterji et al. | 166/293 |
| 5,875,846 A | | 3/1999 | Chatterji et al. | 166/293 |
| 5,911,282 A | | 6/1999 | Onan et al. | 175/72 |
| 5,913,364 A | | 6/1999 | Sweatman | 166/281 |
| 5,945,387 A | | 8/1999 | Chatterji et al. | 507/224 |
| 5,957,204 A | | 9/1999 | Chatterji et al. | 166/295 |
| 5,960,877 A | | 10/1999 | Funkhouser et al. | 166/270 |
| 5,963,580 A | | 10/1999 | Eckert | 373/42 |
| 5,964,293 A | | 10/1999 | Chatterji et al. | 166/294 |
| 5,968,879 A | | 10/1999 | Onan et al. | 507/202 |
| 5,969,006 A | | 10/1999 | Onan et al. | 523/166 |
| 6,006,835 A | | 12/1999 | Onan et al. | 166/294 |
| 6,006,836 A | | 12/1999 | Chatterji et al. | 166/295 |
| 6,032,733 A | | 3/2000 | Ludwig et al. | 166/60 |
| 6,060,434 A | | 5/2000 | Sweatman et al. | 507/216 |
| 6,069,117 A | | 5/2000 | Onan et al. | 507/202 |
| 6,078,031 A | | 6/2000 | Bliault et al. | 219/607 |
| 6,098,711 A | | 8/2000 | Chatterji et al. | 166/294 |
| 6,109,350 A | | 8/2000 | Nguyen et al. | 166/281 |
| 6,112,808 A | | 9/2000 | Isted | 166/60 |
| 6,112,813 A | | 9/2000 | Head | 166/302 |
| 6,167,967 B1 | | 1/2001 | Sweatman | 166/281 |
| 6,187,839 B1 | | 2/2001 | Eoff et al. | 523/130 |
| 6,234,251 B1 | | 5/2001 | Chatterji et al. | 166/295 |
| 6,244,344 B1 | | 6/2001 | Chatterji et al. | 166/295 |
| 6,258,757 B1 | | 7/2001 | Sweatman et al. | 507/219 |
| 6,269,876 B1 | | 8/2001 | Rouffignac et al. | 166/60 |
| 6,271,181 B1 | | 8/2001 | Chatterji et al. | 507/219 |
| 6,279,652 B1 | | 8/2001 | Chatterji et al. | 166/194 |
| 6,285,014 B1 | | 9/2001 | Beck et al. | 219/644 |
| 6,321,841 B1 | | 11/2001 | Eoff et al. | 166/291 |
| 6,328,106 B1 | | 12/2001 | Griffith et al. | 166/295 |
| 6,330,917 B1 | | 12/2001 | Chatterji et al. | 166/295 |
| 6,350,309 B1 | | 2/2002 | Chatterji et al. | 106/677 |
| 6,353,706 B1 | | 3/2002 | Bridges | 392/306 |
| 6,384,389 B1 | | 5/2002 | Spencer | 219/635 |
| 6,401,817 B1 | | 6/2002 | Griffith et al. | 166/295 |
| 6,431,282 B1 | | 8/2002 | Bosma et al. | 166/288 |
| 6,448,206 B1 | | 9/2002 | Griffith et al. | 507/219 |
| 6,474,414 B1 | | 11/2002 | Gonzalez et al. | 166/277 |
| 6,503,870 B1 | | 1/2003 | Griffith et al. | 507/219 |
| 6,508,306 B1 | | 1/2003 | Reddy et al. | 166/295 |
| 6,516,884 B1 | | 2/2003 | Chatterji et al. | 166/294 |
| 6,540,018 B1 | | 4/2003 | Vinegar et al. | 166/60 |
| 6,555,507 B1 | | 4/2003 | Chatterji et al. | 507/219 |
| 6,593,402 B1 | | 7/2003 | Chatterji et al. | 524/7 |
| 6,607,036 B1 | | 8/2003 | Ranson et al. | 166/302 |
| 6,926,083 B1 | | 8/2005 | Larovere | |
| 2002/0056553 A1 | | 5/2002 | Duhon et al. | 166/302 |
| 2002/0158064 A1 | | 10/2002 | Spencer | 219/635 |
| 2003/0019867 A1 | | 1/2003 | Spencer | 219/635 |
| 2003/0132224 A1 | | 7/2003 | Spencer | 219/635 |
| 2003/0162670 A1 | | 8/2003 | Sweatman et al. | 507/100 |
| 2003/0181338 A1 | | 9/2003 | Sweatman et al. | 507/100 |
| 2004/0256105 A1 | | 12/2004 | Lopez | 166/303 |
| 2005/0274521 A1 | | 12/2005 | Larovere | |

FOREIGN PATENT DOCUMENTS

| | | |
|---|---|---|
| WO | WO 01/66990 A1 | 9/2001 |
| WO | WO 01/94741 A1 | 12/2001 |
| WO | WO 2004/042188 A2 | 5/2004 |

OTHER PUBLICATIONS

Paper entitled "Cementing" by Dwight K. Smith, dated 1990, pp. 42-58.

Halliburton brochure entitled "Latex 2000 Cement Additive" dated 1998.

Halliburton brochure entitled "Increased Integrity with the StrataLock Stabilization System" dated 1998.

Halliburton brochure entitled "StrataLock™ Wellbore/Formation Stabilization System" dated 2003.

Foreign communication from a related counterpart application dated Nov. 21, 2005.

* cited by examiner

METHOD FOR ACCELERATING OIL WELL CONSTRUCTION AND PRODUCTION PROCESSES AND HEATING DEVICE THEREFOR

BACKGROUND

This disclosure relates to a method for providing localized heating in an oil well at precise depths to accomplish or expedite specific objectives. The disclosure also relates to the use of a heating tool which can be lowered into an oil well to apply heat at a precise depth to achieve a desired result. The specific objectives may include localized heating of a fresh cement slurry or other sealant having a similar purpose to accelerate curing, or localized heating of recently emplaced chemicals which are formulated to be thermally activated. One purpose of such chemicals is to viscosify or increase in gel strength after being pumped into an oil well production zone, in order to restrict the production of unwanted formation fluids such as water.

Current techniques for cementing steel or other casing in a borehole during oil well construction involve emplacing a fluid cement slurry between the casing and the borehole, after which the cement slurry is allowed to set up or cure to become hard as rock. The cement provides a bond between the casing and the surrounding rock formation. The curing of the cement requires a waiting period which necessarily increases the total time required to construct the well. It is commonly known that the time required for the curing process decreases if the temperature of the cement slurry is increased. Also, to minimize construction cost it is preferred to minimize the time required for the cement to cure. Currently, any heating to accelerate the curing of the cement slurry is provided by the natural surrounding environment as well as the heat generated by the exothermic reactions involved in the cement curing process. Accordingly, it would be desirable to provide a tool to effect an increase in cement slurry temperature to accelerate the curing of the cement slurry.

During the production phase of an oil or gas well, some amount of water may also be produced, which is usually not desirable since the water has no market value. In some wells, the fraction of water produced, relative to the desired fluids, is so great that it impairs well profitability, such that conformance treatments, also known as water shut-off treatments, are performed on the well. Conformance chemicals are fluids designed to react or interact with formation rock and/or formation fluids in such manner that they reduce or eliminate the rate at which water is produced. It would be desirable to emplace such conformance chemicals at particular depth locations at or near the rock formations from which oil and/or gas is produced and then to thermally activate such conformance chemicals.

Downhole heating tools used to provide localized heat at perforation locations in producing oil wells. The heating tool increases the temperature of the produced oil which results in an increase in flow rate through the perforations due to a consequent decrease in viscosity of the produced oil.

Therefore, what is needed is a heating tool and a method for using a heating tool to reduce the curing time of a cement slurry or other sealant having a similar purpose and to heat conformance chemicals that are designed to be thermally activated.

DETAILED DESCRIPTION

Cement and Sealant Applications

Figure 1:
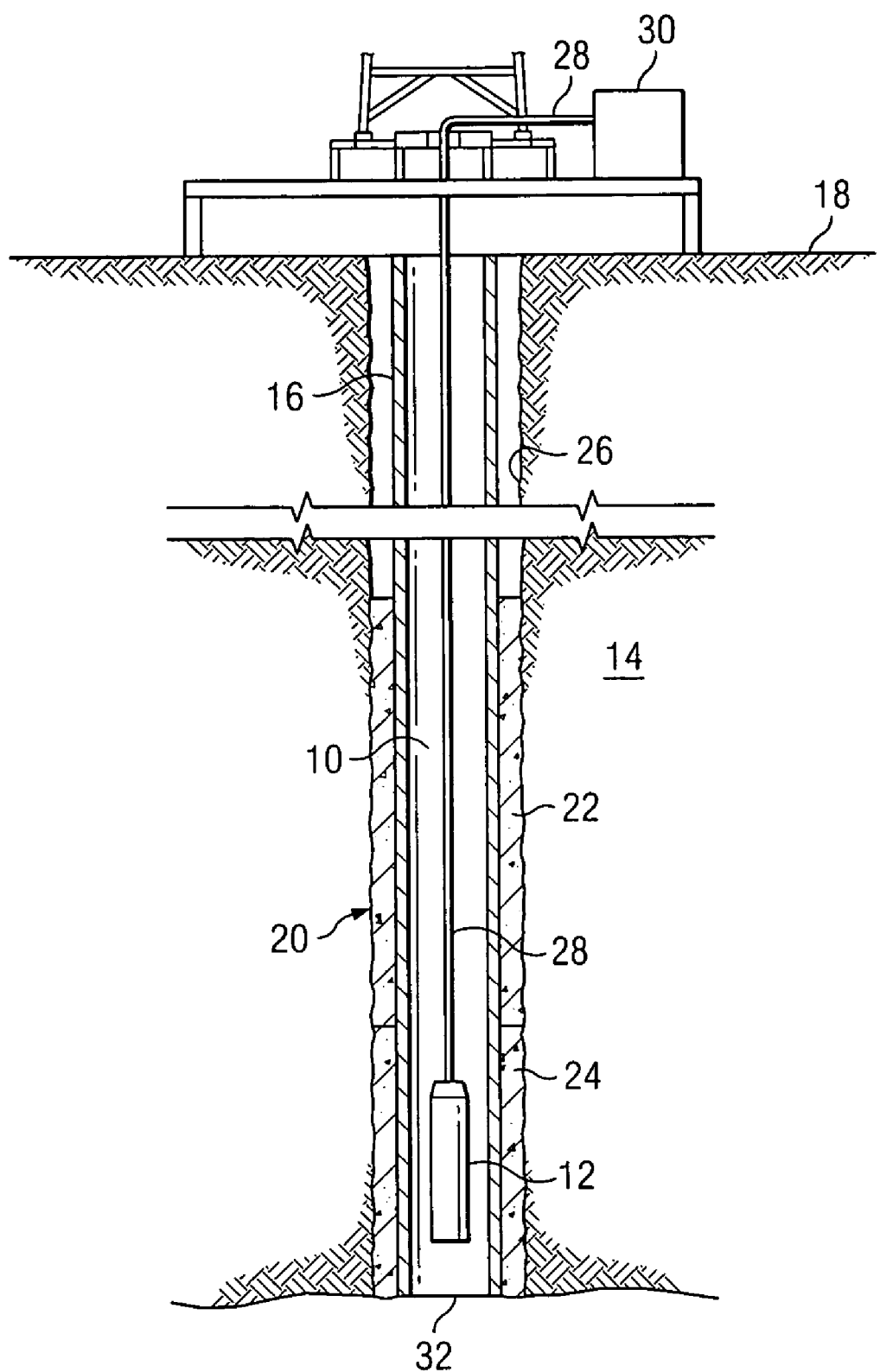
FIG. 1 is a schematic view of a downhole heating tool apparatus according to an embodiment of the present invention, shown in a vertical well bore.

The method of this embodiment may be utilized to facilitate the cementing or other means of sealing casing to the bore hole wall in a well. Referring to FIG. 1, a heating tool 12 according to an embodiment of the present invention is shown lowered into an underground, substantially vertically-extending, well bore 10 that penetrates a hydrocarbon producing subterranean formation 14. A casing 16 extends from the ground surface 18 into the well bore 10. As shown in FIG. 1, an unset sealant such as a cement slurry 20 including a lead cement portion 22 and a tail cement portion 24, is emplaced in the annulus 26 between the casing 16 and the formation 14.

The heating tool 12 is connected by electric cable 28 to an electric power supply control station 30. A suitable heating tool for this purpose is disclosed in U.S. Pat. No. 6,384,389 and U.S. Patent Publication No. 2002/0158064, the entire disclosures of which are hereby incorporated herein by reference.

Preferably, the heating tool 12 is lowered into the well bore 10 to a preferred location which, in the case of cement, is usually the tail cement portion 24 at the bottom 32 of the well bore 10.

A variety of sealants can be used with the present embodiment, including cements, cements combined with latex, cements combined with resin and resins.

A cementing composition for sealing a subterranean zone penetrated by a well bore according to the present embodiment comprises a mixture of cementitious material ("cement") and sufficient water to form a slurry. Suitable cements may include calcium, aluminum, silicon, oxygen, and/or sulfur, which set and harden by reaction with water ("hydraulic cements"). Such hydraulic cements include Portland cements, pozzolan cements, gypsum cements, aluminous cements, silica cements, and alkaline cements. Portland cements of the type defined and described in API Specification 10, 5$^{th}$ Edition, Jul. 1, 1990, of the American Petroleum Institute (the entire disclosure of which is hereby incorporated as if reproduced in its entirety) are preferred. API Portland cements include Classes A, B, C, G, and H, of which API Class G is particularly preferred for the present embodiment. Another suitable cementitious material includes MgO cements. It is understood that the desired amount of cement is dependent on the volume required for the cementing operation. Alternatively, the cement can be microfine cement, such as is available from Dyckerhoff GmBH, Lengerich, Germany, under the trademark "MICRODUR RU."

The water used to form a cement slurry is present in an amount sufficient to make the slurry pumpable for introduction down hole. The water used to form a cement slurry in the present embodiment can be fresh water, unsaturated salt solution, including brines and seawater, and saturated salt solution. Generally, any type of water can be used, provided that it does not contain an excess of compounds well known to those skilled in the art, that adversely affect properties of the cement slurry. The water is present in a range of about 25–98 mass percent of the cement slurry, and more preferably in an amount of about 38 mass percent of the cement slurry.

As noted above, the cement slurry may also include other materials to enhance the sealing capability of the cement slurry. Generally, such materials may include latexes and resins.

Suitable commercially available latexes, most of which are synthetic, include styrene butadiene copolymer latex and nitrile latex which are commercially available from Reichhold Chemicals, Inc., Research Triangle Park, N.C. under the trade name Tylac®, styrene butadiene acrylonitrile copolymer latex which is commercially available from Reichhold Chemicals, Inc., Research Triangle Park, N.C. under the trade name SNAP®, vinyl acetate homopolymer latex, vinyl acetate acrylate copolymer latex and -carboxylated styrene-butadiene copolymer latex which are commercially available from Reichhold Chemicals, Inc., Research Triangle Park, N.C. under the trade name Synthemul® and carboxylated acrylic copolymer latex which is commercially available from Reichhold Chemicals, Inc., Research Triangle Park, N.C. under the trade name Tychem®. Other suitable latexes include products that are available from Halliburton Energy Services, Inc. under the trade name Latex 2000®, which is a styrene-butadiene copolymer, and LAP1®, which is a partially hydrolyzed polyvinyl acetate isolated in the process of synthesizing latex, and other latex-based compounds.

Suitable commercially available resins, include epoxy resins that are condensation products of epichlorohydrin and bisphenol A which are commercially available from Shell Chemical Company under the trade name Epon Resin 828®, Epi-Rez-3510-W-60®, and Epi-Rez-5003-W-55®. Another suitable epoxy resin is commercially available from Halliburton Energy Services, Inc. under the trade name Stratalock®.

Other sealants for sealing a subterranean zone include epoxy resins with an attendant hardener plus filler additives such as silica flour. Another suitable sealant is commercially available from Halliburton Energy Services, Inc. under the trade name "Hydromite" which is a combination of gypsum cement and melamine resin. As will be understood, melamine resin has at its base the organic chemical compound, melamine, $C_3H_6N_6$, which is a white crystalline material commonly used as a base for making plastics.

It will be understood that the latex and resin materials may be used alone or can be combined with a suitable cement material as mentioned above. The formulation of such sealants can be designed so that an increase in temperature accelerates the curing rate of such sealants. Such design of the sealants enables their curing rates to be accelerated by the use of a suitable heating tool as discussed above.

The heating tool 12 influences the temperature of the curing sealant at the tool location. An increase in the sealant temperature accelerates the curing or setting of the sealant. Heat from the heating tool 12 has been shown to radiate horizontally from the tool 12 but not vertically. Thus, precise placement of the heating tool 12 permits selective curing or setting of sealants with the ability to flush or produce back to the surface any uncured or unset sealant material. In the absence of the heating tool 12 of this embodiment, the temperature of the sealant is governed by the surrounding environment and the heat generated by the chemical reactions in the sealant.

Methods of this embodiment for sealing a subterranean zone include preparing a sealing composition as described herein, placing the sealing composition into the subterranean zone and heating the sealing composition to accelerate the setting of the sealing composition. According to preferred methods, the sealing composition is placed in the subterranean zone by pumping the sealing composition through a drill string and bit, circulating excess material out of the subterranean zone and removing the drill string and bit from the subterranean zone prior to heating the sealing composition. According to other preferred methods, a heating tool as described above is lowered into the subterranean zone to heat the sealing composition.

Conformance Applications

The method of this embodiment may be utilized to thermally activate conformance chemicals. According to this embodiment, conformance chemicals are first pumped into perforation locations through which it is intended that oil and/or gas is produced but which only produces water. The conformance chemicals are incorporated in conformance fluids so that at elevated temperatures, the viscosity or gel strength of such conformance fluids increases permanently and substantially, by orders of magnitude, for instance, thereby to prevent any further flow of water into the well through such perforations.

Figure 2:
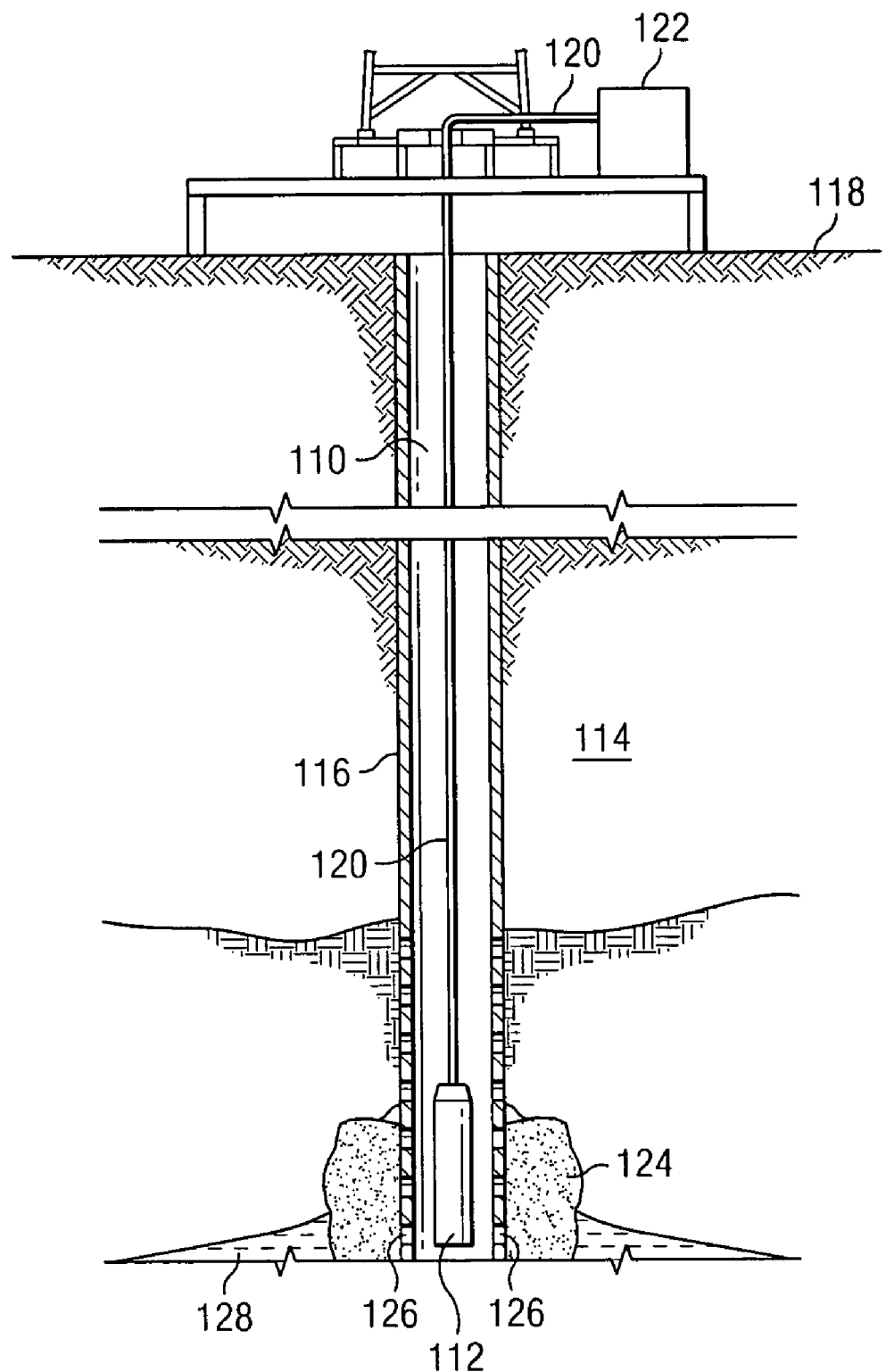
FIG. 2 is a schematic view of a downhole heating tool apparatus according to an embodiment of the present invention, shown in a vertical well bore.

Referring to FIG. 2, in conventional conformance treatments, a heating tool 112 according to an embodiment of the present invention is shown lowered into an underground, substantially vertically-extending, well bore 110 that penetrates a hydrocarbon producing subterranean formation 114. Typically, production casing 116 extends from the ground surface 118 into the well bore 110.

The heating tool 112 is connected by electric cable 120 to an electric power supply control station 122. A suitable heating tool for this purpose is disclosed in U.S. Pat. No. 6,384,389 and U.S. Patent Publication No. 2002/0158064, the entire disclosures of which are hereby incorporated herein by reference.

According to this embodiment, conformance fluids 124 including conformance chemicals are pumped through the perforations 126 and into the permeable rock at prescribed depths, such depths being locations of unwanted water production 128. The conformance chemicals are fluid when pumped in, and, in time, viscosify or increase in gel strength, or harden or solidify in some manner so as to prevent further flow of water 128 through perforations 126. The reaction generally occurs in the region near and around the wellbore, and the reaction rate causing these rheological changes is influenced in part by the temperature of the surrounding environment. Generally, the higher the temperature, the faster the reaction.

Accordingly, the heating tool 112 is preferably lowered into the wellbore 110 to the location at which the conformance chemicals 124 are emplaced, after which the tool is energized. Preferably the conformance chemicals 124 are designed to activate or viscosify more rapidly at higher temperatures. The heating provided by the tool 112 thereby accelerates the process and reduces the time required to complete the conformance process by setting the conformance chemical product. Heat from the heating tool 112 has been shown to radiate horizontally from the tool 112 but not vertically. Thus, precise placement of the heating tool 112 permits selective setting of conformance chemicals with the ability to flush or produce back to the surface any unset material. In this context, the term "setting" means substantially increasing the viscosity or gel strength of fluids designed to become more viscous soon after one or both of progressing through casing perforations and permeating into rock pore space.

Conformance compositions are designed so that elevated temperatures increase the rate of acceleration of the viscosity of the conformance compositions so as to prevent unwanted cross-flow of rock formation fluids in which fluids from one rock formation channel through the wellbore outside the casing to another rock formation by virtue of a pressure difference between the two rock formations. An example of such undesired cross-flow of rock formation fluids is when water which has no commercial value channels in this manner to contaminate hydrocarbon-bearing zones and thereby be produced at the surface instead of the commercially valuable hydrocarbon.

Examples of such conformance chemicals include, but are not limited to: monomers, non-crosslinked polymers, resins, crosslinked polymers, fine-particle cement, conventional cement when the cavity to be filled is sufficiently large, for example, cavities having a volume of 4 or 5 cubic feet or more, silicates and MgO cement.

A suitable conformance monomer is acrylamide, and its attendant polymer polyacrylamide. Such monomers and polymers are commercially available from Halliburton Energy Services, Inc. and are employed in Halliburton's K-Trol Service,® in which they are pumped down a well into a water-bearing formation together with a suitable crosslinking agent such as sodium persulfate. The crosslinking reaction, which essentially turns the liquid mixture into a homogeneous semi-solid, takes place in situ, and temperature is a key determinant of the rate at which the crosslinking reaction takes place. An increase in temperature accelerates the reaction.

Another suitable monomer is a polymerizable hydroxy unsaturated carbonyl, which can be crosslinked by reaction with an alkali-metal persulfate. The polymerizable hydroxy unsaturated carbonyl and the alkali-metal persulfate are commercially available from Halliburton Energy Services, Inc. and are used in Halliburton's PermSeal® conformance service.

In addition to the monomers and polymers mentioned above, resins and similar chemicals may also be used to accomplish the same purpose. Suitable resins for this purpose include epoxy-resin products commercially available from Shell Chemical Company under the trade names Epon Resin 828®, Epi-Rez-3510-W-60®, and Epi-Rez-5003-W-55®, and an epoxy resin commercially available from Halliburton Energy Services, Inc. under the trade name Stratalock®.

A suitable fine-particle cement is commercially available from Halliburton Energy Services, Inc. under the trade name Micro-Matrix® cement. Micro-Matrix® cement has a typical particle size of less than one tenth that of conventional cement and can permeate rock pores of any diameter exceeding 50 microns. Those of ordinary skill in the art will understand that the conformance composition may also include other desirable components such as catalysts and activating agents to enhance the intended increase in viscosity.

Methods of this embodiment for performing conformance operations in a subterranean zone include preparing a conformance composition for inhibiting the production of water as described herein, placing the conformance composition into the subterranean zone adjacent a location of water production and heating the conformance composition to accelerate the setting or to increase the viscosity of the conformance composition.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A method for sealing casing in a borehole comprising:
   preparing a sealing composition comprising an epoxy liquid comprising resin, associated hardener and inert filler material;
   placing the sealing composition between the casing and the borehole;
   placing a heating tool in the casing; and
   operating the heating tool to heat the sealing composition at the location of the heating tool to accelerate the setting of the sealing composition.

2. The method of claim 1 wherein the resin is a condensation product of epichlorohydrin and bisphenol A.

3. The method of claim 1 wherein the sealing composition further comprises at least one of cement and latex.

4. The method of claim 3 wherein the sealing composition further comprises a cement slurry comprising cement and water.

5. The method of claim 4 wherein the cement is selected from the group consisting of pozzolan cement, gypsum cement, aluminous cement, silica cement, and alkaline cement.

6. The method of claim 5 wherein the cement is class G cement.

7. The method of claim 4 wherein the water is present in a range of 25–98 mass percent of the cement slurry.

8. The method of claim 4 wherein the cement slurry further comprises latex.

* * * * *